(12) United States Patent
Semsey (10) Patent No.: US 8,175,784 B2
(45) Date of Patent: May 8, 2012

(54) COMPENSATED WEDGE CONTROL (75) Inventor: Akos Semsey, Regensburg (DE)

(73) Assignee: Continental Automotive GmbH,
Hannover (DE)

( * ) Notice: Subject to any disclaimer, the term of this patent is extended or adjusted under 35 U.S.C. 154(b) by 490 days.

(21) Appl. No.: 12/518,535

(22) PCT Filed: Nov. 20, 2007

(86) PCT No.: PCT/EP2007/062590
§ 371 (c)(1),
(2), (4) Date: Jun. 10, 2009

(87) PCT Pub. No.: WO2008/071523
PCT Pub. Date: Jun. 19, 2008

(65) Prior Publication Data
US 2010/0070147 A1 Mar. 18, 2010

(30) Foreign Application Priority Data
Dec. 12, 2006 (DE) .......................... 10 2006 058 565

(51) Int. Cl.
*G06F 19/00* (2006.01)
*F16D 65/14* (2006.01)
(52) U.S. Cl. ......................................... 701/70; 188/72.7
(58) Field of Classification Search ............. 701/70; 702/108, 115; 324/415; 188/72.7
See application file for complete search history.

(56) References Cited

U.S. PATENT DOCUMENTS

| | | | |
|---|---|---|---|
| 6,305,506 B1 | 10/2001 | Shirai | |
| 6,318,513 B1 * | 11/2001 | Dietrich et al. | 188/72.7 |
| 6,523,911 B1 * | 2/2003 | Rupp et al. | 303/7 |
| 6,752,247 B2 | 6/2004 | Hartsock | |
| 6,938,737 B2 | 9/2005 | Hartsock | |
| 7,143,873 B2 * | 12/2006 | Pascucci et al. | 188/72.7 |
| 2003/0205438 A1 | 11/2003 | Hartsock | |
| 2004/0108175 A1 * | 6/2004 | Schautt | 188/72.7 |
| 2004/0178027 A1 | 9/2004 | Hartsock | |
| 2005/0167212 A1 * | 8/2005 | Pascucci et al. | 188/72.2 |
| 2007/0000738 A1 | 1/2007 | Baumann | |
| 2010/0133051 A1 * | 6/2010 | Trimpe et al. | 188/156 |

FOREIGN PATENT DOCUMENTS

| | | |
|---|---|---|
| DE | 10218825 A1 | 11/2003 |
| DE | 10338449 A1 | 3/2005 |
| EP | 0953785 A2 | 11/1999 |
| FR | 2885976 A1 | 11/2006 |

OTHER PUBLICATIONS

International PCT Search Report, PCT/EP2007/062590, 11 pages, Mailed Mar. 20, 2008.
German Investigation Report, German Application No. 10 2006 058 565.8, Jul. 5, 2007.

* cited by examiner

*Primary Examiner* — Yonel Beaulieu
(74) *Attorney, Agent, or Firm* — King & Spaulding L.L.P.

(57) ABSTRACT

In a method for controlling electromechanical brakes of a vehicle brake system, the brakes have at least one self-boosting device and the method has steps for switching a first sub-group of the electromechanical brakes (10) from a first operating position (27) into a second operating position (28) and for varying the brake force (41) of a second sub-group of the electromechanical brakes (10) during the switch of the first sub-group of the electromechanical brakes (10) such that the overall brake force applied by the vehicle brake system substantially always corresponds to the brake force setpoint value (46) for the vehicle brake system.

14 Claims, 4 Drawing Sheets

COMPENSATED WEDGE CONTROL

CROSS-REFERENCE TO RELATED APPLICATIONS

This application is a U.S. National Stage Application of International Application No. PCT/EP2007/062590 filed Nov. 20, 2007, which designates the United States of America, and claims priority to German Application No. 10 2006 058 565.8 filed Dec. 12, 2006, the contents of which are hereby incorporated by reference in their entirety.

TECHNICAL FIELD

The invention relates to the control of the braking force applied by a brake system which includes several electromechanical wedge brakes. The invention relates particularly to the regulation or control of the braking force applied by the brake system while a subgroup of the brakes of the brake system is switched from a first operating position to a second operating position.

BACKGROUND

With electromechanical wedge brakes, the friction lining is guided by an electrically controlled actuator which moves it at an incline along a wedge surface against the brake object, usually designed as a brake disk. Several variants of a self-boosting electromechanical wedge brake are known.

The basic components of a wedge brake generally consist of a passive wedge plate, an active wedge plate and an actuator to move the active wedge plate relative to the brake object. The active wedge plate usually serves as a support and guide for the friction lining, so that the friction lining can be moved to and from the object to be braked by the movement of the active wedge plate. To reduce the friction between the active and passive wedge plates, a roller bearing or similar can be arranged between the opposing wedge surfaces.

For this reason, wedge brakes basically have a support for the friction lining, which runs at an incline relative to the direction of running of the brake object. For this purpose, there are usually one or more wedge surfaces on the support, along which the guidance of the friction lining takes place. When the friction lining comes into contact with the brake object, it is carried by the brake object in its direction of travel. If the slope of the wedge surface is in the direction of travel of the brake object, the carrying of the friction lining leads to a further advance of the friction lining against the brake object. This intensifies the pressure of the brake lining on the brake object, causing an increase in the braking friction force to be achieved. The braking force thus increases automatically due to the motive energy applied to the brake object, without the friction element having to be actively displaced further against the object by the actuator. This effect is generally known as self boosting. A mathematical treatment of the self-boosting effect is given in Patent EP 0 953 785. According to this, the force $F_E$ to be applied by the actuator to the wedge arrangement in order to achieve a specific braking force $F_B$, i.e. the friction force generated on the friction element, reduces according to the following equation:

$$F_E = -F_B \cdot [1-(\tan \alpha/\mu)]. \quad (1)$$

In equation (1), $\alpha$ is the angle between the wedge surface and the movement plane and $\mu$ is the coefficient of friction for the material pair consisting of the friction lining and surface of the brake object.

During a switch of the direction of travel of the brake object, the slope of the wedge surface points away from the direction of travel of the brake object so that the pressure of the friction lining on the brake object is reduced. An attenuation of the force exerted by the actuator takes place. The resulting maximum braking force is therefore less than for a movement of the brake object in the direction of the slope of the wedge surface.

In order to be also able to achieve a maximum braking effect with this opposite direction of travel of the brake object, electromechanical wedge brakes have one or more further wedge surfaces whose slope advances the active wedge plate to the brake object during a movement in this opposite direction.

The wedge surfaces of the active wedge plate are usually arranged on the side surface of the wedge plate opposite to the friction lining. The displacement of the active wedge plate by the actuator is effected by a transmission element which connects the active wedge plate to the actuator. The passive wedge plate is, in contrast, fixed relative to the actuator, for example to a brake caliper of the electromechanical wedge brake. Their wedge surfaces are arranged opposite the wedge surfaces of the active wedge plate.

At higher vehicle speeds, the brakes of a vehicle must be able to generate the maximum possible braking force. When electromechanical wedge brakes are used this means that the wedge plates are in the operating position for self-boosting during braking, i.e. that the active wedge plate is displaced in the direction of travel of the brake disk. The maximum braking force is achieved when all the wedge brakes of the vehicle are positioned in the direction of self-boosting for the particular driving direction, i.e. positioned in the same direction.

With a stationery vehicle, it must on the other hand be ensured that the vehicle cannot roll in any of the two possible directions of movement. For this purpose, the wedge brakes of the vehicle are positioned in inverse direction, i.e. a subgroup of the brakes of the brake system of the vehicle is switched to an operating mode with self-boosting in a forward direction of the vehicle and another subgroup of the brakes is switched to an operating position with self-boosting in the rearward direction of the vehicle. Movement of the vehicle due to unevenness or sloping of the roadway is therefore precluded because the braking force for a subgroup of the brakes is always self-boosted and therefore able to hold the vehicle when at a standstill.

Problems do, however, occur during the transition from movement of a vehicle to standstill. If, for example, a vehicle is braked in order to bring it to a standstill within a certain braking distance it is possible that after the vehicle has come to a standstill on a slope on the roadway against the original direction of travel it can roll back because all the wedge brakes are aligned for self-boosting in the original direction of travel and the opposite direction of travel applies only a slight braking force. Therefore, the wedge brakes of the vehicle are positioned in the inverse direction before it comes to a standstill, i.e. one subgroup of the brakes is positioned in the direction of self-boosting opposite to the current direction of travel.

During a switch of a wedge brake from the self-boosting direction to the self-attenuating direction, the active wedge plate moves through the neutral position at which the friction lining no longer contacts the brake object. The braking force in the neutral position is therefore equal to zero. Only when there is a further contact with the brake object does the friction lining again generate a braking force, which due to the prevailing self-attenuating effect can be less than previously generated using the self-boosting effect. As a result, the braking force generated by a brake during the switch from the operating position which is self-boosting to the operating position without self-boosting changes. This variation in the braking force is perceived by the occupants of the vehicle as a jolt which impairs driving comfort.

In the reverse case, during a slow or only partial release of the wedge brakes of a vehicle standing on an incline the wedge brakes positioned against the direction of rolling must be switched to the direction of self-boosting for the rolling direction before the vehicle reaches a specific threshold speed. Here too, a temporary decrease in the braking force occurs, which can be perceived in the interior of the vehicle as a jolt.

SUMMARY

According to various embodiments, a control system for a vehicle brake system based on electromechanical wedge brakes can be provided which enables the switching of a subgroup of the wedge brakes from a first operating position to a second operating position without impairment, e.g. jolting, of the driving comfort.

According to an embodiment, in a method for controlling electromechanical brakes of a vehicle brake system, the brakes have at least one self-boosting device and the method comprises the steps of:—switching a first subgroup of the electromechanical brakes from a first operating position to a second operating position, and—varying the braking force of a second subgroup of the electromechanical brakes during the switch of the first subgroup of the electromechanical brakes, such that the overall braking force applied by the vehicle brake system substantially always corresponds to the braking force setpoint value for the vehicle brake system.

According to another embodiment, a device for controlling electromechanical brakes of a vehicle brake system, wherein the brakes have at least one self-boosting device, may comprise:—a switching device for switching a first subgroup of the electromechanical brakes from a first operating position to a second operating position and—a braking force varying device for varying the braking force of a second subgroup of the electromechanical brakes during the switch of the first subgroup of the electromechanical brakes so that the total braking force applied by the vehicle braking system always substantially corresponds to the braking force setpoint value for the vehicle braking system.

According to further embodiments, the varying of the braking force of the second subgroup of the electromechanical brakes may substantially compensate for the deviation of the braking force of the first subgroup of the electromechanical brakes from the braking force setpoint value for the first subgroup of the electromechanical brakes. According to further embodiments, the varying of the braking force of the second subgroup of the electromechanical brakes may take place on the basis of a predetermined function, which specifies the deviation of the braking force of the first subgroup of the electromechanical brakes from the braking force setpoint value for the first subgroup of the electromechanical brakes during the switch from the first operating position to the second operating position. According to further embodiments, the varying of the braking force of the second subgroup of the electromechanical brakes may take place on the basis of a measurement of the current braking force of at least the first subgroup of the electromechanical brakes. According to further embodiments, the switching of the first subgroup of the electromechanical brakes and the varying of the braking force of the second subgroup of the electromechanical brakes may take place during the switch, so that the distribution of the braking force applied by the vehicle braking system to the first and second subgroups of the electromechanical brakes after switching corresponds to a predetermined distribution. According to further embodiments, the switch of the first subgroup of the electromechanical brakes may take place at a specific vehicle speed. According to further embodiments, the switch of the first subgroup of the electromechanical brakes may take place at a specific driving dynamic condition.

BRIEF DESCRIPTION OF THE DRAWINGS

Further features of the invention result from the following description of exemplary embodiments in conjunction with the claims and the figures. The individual features can be realized by embodiments either singly or in combination. In the following explanation of a few exemplary embodiments, reference is made to the accompanying figures, in which:

DETAILED DESCRIPTION

According to various embodiments, a method for controlling electromechanical brakes of a vehicle brake system, with the brakes having at least one self-boosting device, may comprise the steps to switch a first subgroup of the electromechanical wedge brakes from a first operating position to a second operating position and to vary the braking force of a second subgroup of the electromechanical wedge brakes during the switch of the first subgroup of the electromechanical wedge brakes, so that the total braking force exerted by the vehicle brake system substantially always corresponds to the braking force setpoint value for the vehicle brake system. In this connection, it is pointed out that the terms "include", "have", "contain" and "with" and their grammatical variants, used in this description and in the claims to enumerate features, generally indicate the presence of features such as method steps, devices, ranges, variables and similar but in no way preclude the presence of other or additional features or groupings of other or additional features. Furthermore, it is pointed out that the terms control and regulate in this publication are used synonymously, in deviation from the normal German language usage. Therefore processes with a feedback of the control variable are to be subsumed under the term control, as are also processes without a feedback of the control variable to be subsumed under the terms regulate.

According to another embodiment, a device for the control of electromechanical brakes of a vehicle brake system, with the brakes having at least one self-boosting device, may comprise a switching device for switching a first subgroup of the electromechanical wedge brakes from a first operating position to a second operating position, and also a braking force varying device for varying the braking force of a second subgroup of the electromechanical wedge brakes during the switch of the first subgroup of the electromechanical wedge brakes so that the total braking force applied by the vehicle brake system always substantially corresponds to the braking force setpoint value for the vehicle brake system.

The various embodiments enable an advantageous switch of a wedge for a subgroup of the electromechanical wedge brakes of a vehicle so that no jolting of the vehicle occurs due to a braking force variation.

The maintenance of the total braking force can be advantageously effected in an advantageous development by varying the braking force of the second subgroup of the electromechanical wedge brakes, which substantially compensates for the deviation of the braking force of the first subgroup of the electromechanical wedge brakes from the braking force setpoint value for the first subgroup of the electromechanical wedge brakes. An uncomplicated control is achieved in that the variation of the braking force of the second subgroup of the electromechanical wedge brakes on the basis of a predetermined function takes place, which specifies the deviation of the braking force of the first subgroup of the electromechanical wedge brakes from the braking force setpoint value for the first subgroup of the electromechanical wedge brakes during the switch from the first operating position to the second operating position.

In an advantageous development, the variation of the braking force of the second subgroup of the electromechanical wedge brakes is carried out on the basis of a measurement of the current braking force of at least the first subgroup of the electromechanical wedge brakes, so that the braking force variation of the second subgroup of the wedge brakes can be positioned directly on the basis of the target variable. To match the braking force distribution between the first and second subgroups of the electromechanical wedge brakes to the requirements of current driving dynamics, the switch of the first subgroup of the electromechanical wedge brakes and the varying of the braking force of the second subgroup of the electromechanical wedge brakes favorably takes place during the switch so that the distribution of the braking force applied by the vehicle braking system to the first and second subgroups of the electromechanical wedge brakes after a switch has taken place corresponds to a predetermined distribution. The switch of the first subgroup of the electromechanical wedge brakes preferably takes place at a specific vehicle speed, in order not to negatively influence the driving dynamics of the vehicle. The switch of the first subgroup of the electromechanical brakes can also usefully take place under a specific driving dynamic condition, so that, for example, a good braking effect in the new direction of travel of the vehicle is achieved if the vehicle slides.

Brakes with a device for self-boosting have been known for a long time. On a Duo-servo brake, higher self-boosting of the applied actuating force is obtained, for example, compared with the Simplex brake, in that the self-boosting of the brake shoe making contact is utilized to increase the contact pressure of the second, also contacting, brake shoe. With electromechanical brakes, a self-boosting effect offers the possibility of minimizing the energy used for braking. Electromechanical wedge brakes which, however, have different braking effects in the different operating positions, are presently favored.

Figure 1A:
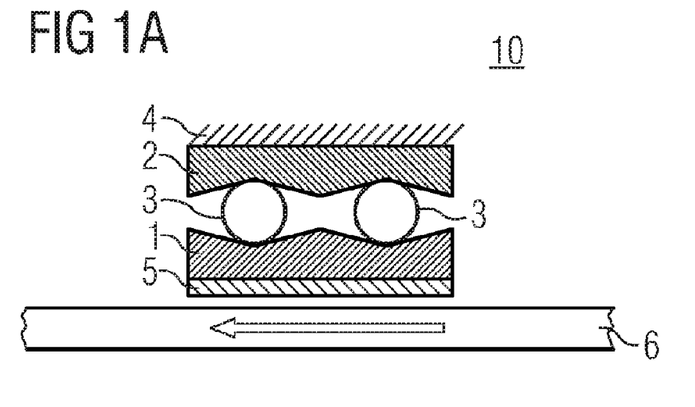
FIG. 1 shows a schematic illustration of three operating positions of a wedge brake.
Figure 1B:
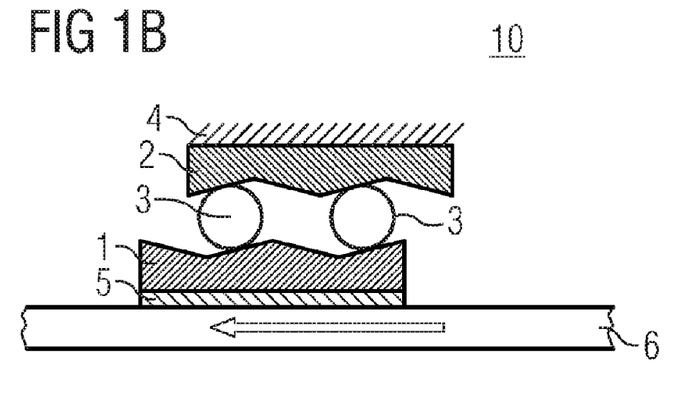
Figure 1C:
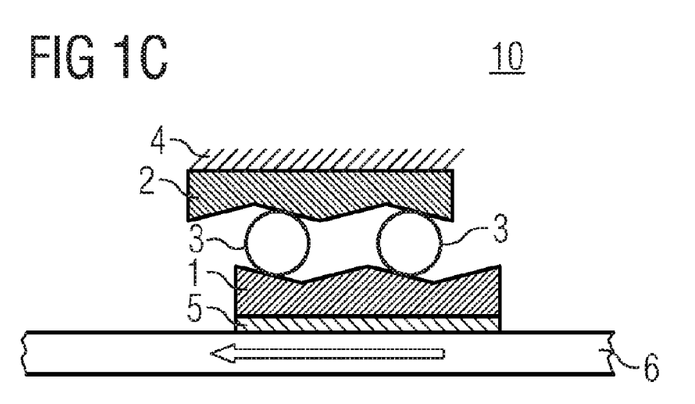

FIG. 1 shows the three different operating positions of a wedge brake 10. In view a the wedge brake is in its neutral position, in view b it is in a position for self-boosting with the movement of the brake object 6 being indicated by an arrow, and in view c the wedge brake is in a position for self-attenuation, with the implied movement of the brake object 6 being indicated.

The wedge brake 10 comprises two wedge plates 1 and 2, between which elements 3 can be arranged, which enable a low-friction displacement of both wedge plates 1 and 2 relative to each other. One of the wedge plates is attached to a fixed carrier 4, normally a brake caliper. It is designated as a passive wedge plate 2. The other wedge plate 2 is moveably arranged relative to the fixed carrier and is designated as an active wedge plate 1. The active wedge plate 1 has a friction lining 5 on the side surface facing away from the elements 3.

The side surfaces of the wedge plates 1 and 2 facing toward each other have wedge surfaces, which can be seen in the view in FIG. 1 as lines sloping relative to the horizontal. The wedge surfaces on each of the wedge plates include one or more pairs of individual surfaces inclined toward each other. Furthermore, in the neutral position of the wedge brake 10, the wedge surface pairs of wedge plate 1 are arranged opposite, substantially as a mirror image, the wedge surface pairs of wedge plate 2. Other embodiments of the wedge surfaces are possible and known, for example those where the wedge surfaces of the passive wedge plate are designed to be complimentary to the wedge surfaces of the active wedge plate.

In the depressions formed in the wedge surfaces in the respective wedge plates are elements 3 whose circumferential shape enables a low-friction rolling of the elements 3 on the wedge surfaces. The elements 3 together with the wedge surfaces form a roller bearing, which enables a displacement of the active wedge plate 1 relative to the passive wedge plate 2 parallel to a wedge surface. In the neutral position, the distance of the active wedge plate 1 from the brake object 6 is such that the friction lining 5 is not in contact with it, or only without any significant pressure effect. The braking effect of the wedge brake 10 in the neutral position is therefore always negligible or zero regardless of the direction of travel of the brake object.

In the operating position of the wedge brake 10 shown in view b, the active wedge plate 1 is displaced relative to the passive wedge plate 2 in the direction of the direction of travel of the brake object shown by the arrow. With this displacement, the rolling elements 3 roll on the wedge surfaces of both wedge plates. Due to the slope of the wedge surfaces and the substantially symmetrical mirror-image opposing position of the wedge surface pairs on the wedge plates, the displacement of the active wedge plate 1 brought about by a brake actuator (not illustrated) has a vertical displacement component. As a result, the friction lining 5 on the active wedge plate 1 moves away from the passive wedge plate 2 toward the brake object 6. Immediately the friction element comes into contact with the brake object 6, it is carried by the brake object 6 in its direction of travel. This carrying has the effect of a further rolling of the wedge plate 1 on the rolling elements 3 so that the wedge plate 1 is pressed harder against the brake object as a result of the boosting of the braking force.

In the operating position of the wedge brake 10 shown in view c, the active wedge plate 1 is displaced relative to the passive wedge plate 2 against the direction of the direction of travel of the brake object shown by the arrow. The contacting of the brake object 6 by the friction lining 5 leads to the active wedge plate being carried in the direction of travel of the brake object 6, thus reducing the pressure of the friction lining 5 on the brake object 6. The force introduced by the actuator is attenuated. If, however, the direction of travel of the brake object 6 is reversed, a self-boosting of the braking force occurs in this position of the wedge plates.

There are also known designs of wedge brakes with which the carrying of the friction lining opposite to the self-boosting direction is not transferred to the wedge surface mechanism. In this case, as shown in view c of FIG. 1, no self-attenuation occurs, but instead merely no self-boosting.

The displacement of the active wedge plate and the adjustment of the braking force takes place via the brake actuator, which is controlled by a brake control device, which can be set up as a technical circuit or by means of a technical program or as a mixture of both forms.

Brake systems of motor vehicles generally include several brakes, normally at least one brake for each wheel of the vehicle. In this way, it is possible, for example when at a standstill or at low speeds, to carry out the switching of the electromechanical wedge brakes mentioned in the introduction, in order to obtain self-boosting on at least one brake for each of the possible driving directions of the vehicle. An example of such an inverse position 20 of the wedge mechanisms of the electromechanical wedge brakes of a two-axle, four-wheel vehicle is shown in FIG. 2.

Figure 2:
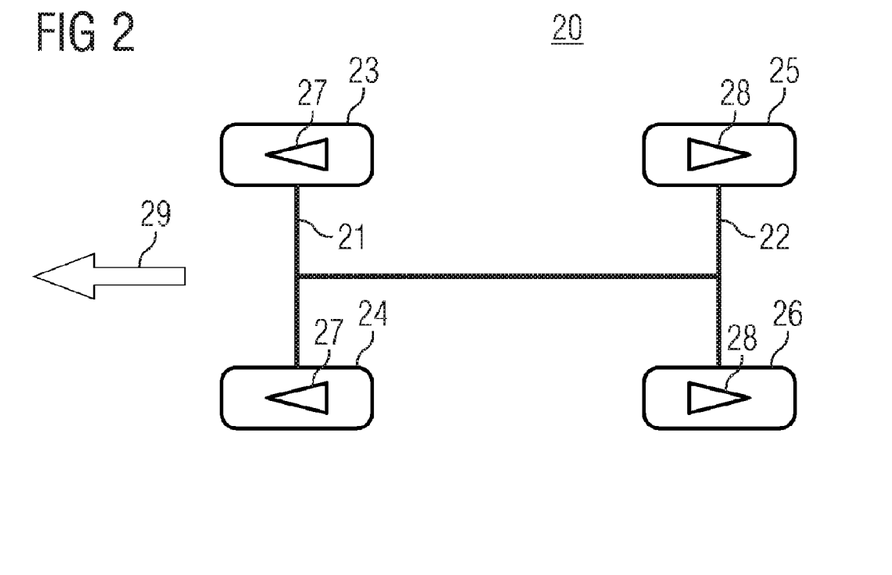
FIG. 2 illustrates an inverse position of the wedge brakes on a four-wheel chassis.

The chassis shown in FIG. 2 has a front wheel axle 21 with a right front wheel 23 and a left front wheel 24, and also a rear wheel axle with a right rear wheel 25 and a left rear wheel 26. Each of the wheels is provided with an electrical wedge brake whose wedge position can be switched or positioned from a first operating position 27 to a second operating position 28. At operating position 27 a self-boosting of the braking force in the forward direction is obtained, at operating position 28 the self-boosting on the other hand takes place in a rearward driving direction of the vehicle.

The forward direction of the vehicle is shown by arrow 29. The inverse position of the wedge brakes is normally used for a handbrake braking situation, which with the vehicle at a standstill guarantees that the vehicle cannot roll away in either of the two possible directions of driving. When the vehicle is being driven forward, an attenuation or at least no boosting of the force introduced via the actuator, however, takes place at operating position 26 depending on the design of the wedge brake, so that the braking force applied at the rear wheels 25 and 26 is generally less than at the front wheels 23 and 24.

Figure 3:
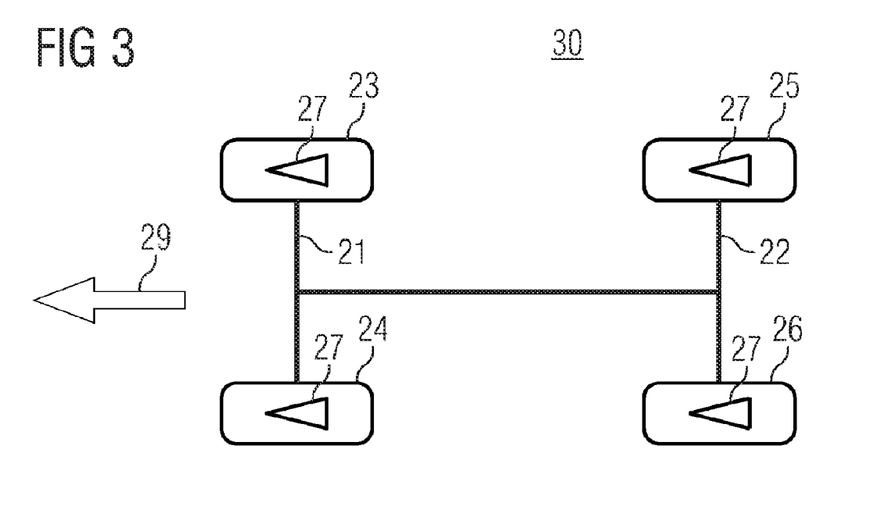
FIG. 3 shows a same-direction position of the wedge brakes in a schematic view of a four-wheel chassis.

FIG. 3 shows the chassis from FIG. 2 with a same-direction position 30 of the wedge brakes. All wedge mechanisms are in operating position 27 for self-boosting of the braking force in the forward direction 29. In this position, each of the brakes can generate the maximum braking force. For reasons of driving dynamics, the braking force distribution over the individual brakes does not, however, normally take place uniformly, but instead is more or less separate for each wheel corresponding to the wheel loading when braking. Sometimes, the wheels of the front axle and the wheels of the rear axle are each combined to form a brake subgroup because due to the brake compression the front wheels are more heavily loaded when braking in forward travel. However, other brake subgroupings are possible, such as those which include braking of wheels arranged diagonally on the chassis. Naturally, the determination of a brake subgroup can also take place only temporarily, so that at one timepoint the braking of the front wheels and at another timepoint the braking of one front wheel and one rear wheel forms a brake subgroup.

If the wedge brakes of a vehicle are switched from a same-direction operating position of all wedge brakes to an inverse operating position during forward driving, the braking force applied by the wedge brakes which are in the operating position for self-boosting during rearward travel is less than with wedge brakes which are in the operating position for self-boosting during forward travel. Because the loading of the rear wheels during braking of a forward-moving vehicle is generally lower than that of the front wheels, the switch of the wedge brakes of the rear wheels is preferred in this case.

Figure 4:
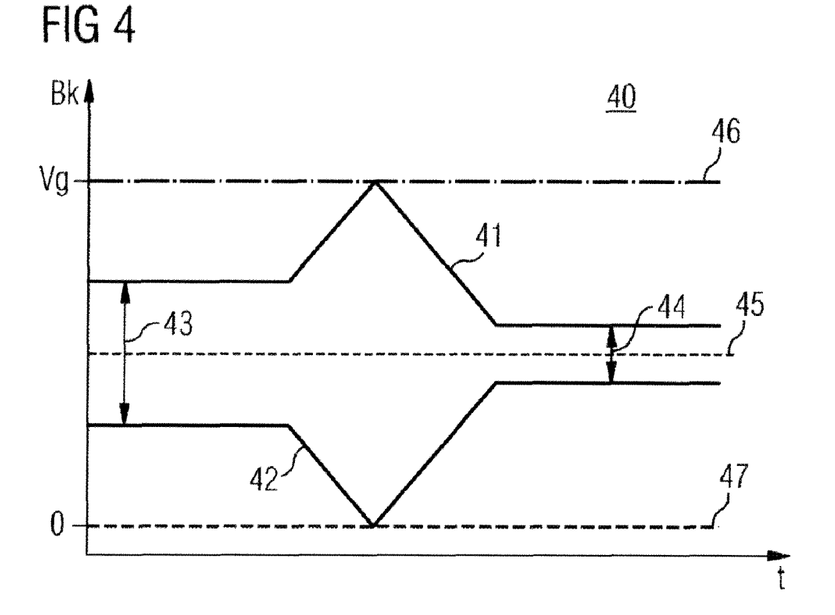
FIG. 4 illustrates a braking force pattern of two brake groups where the total braking force remains constant.
Figure 5:
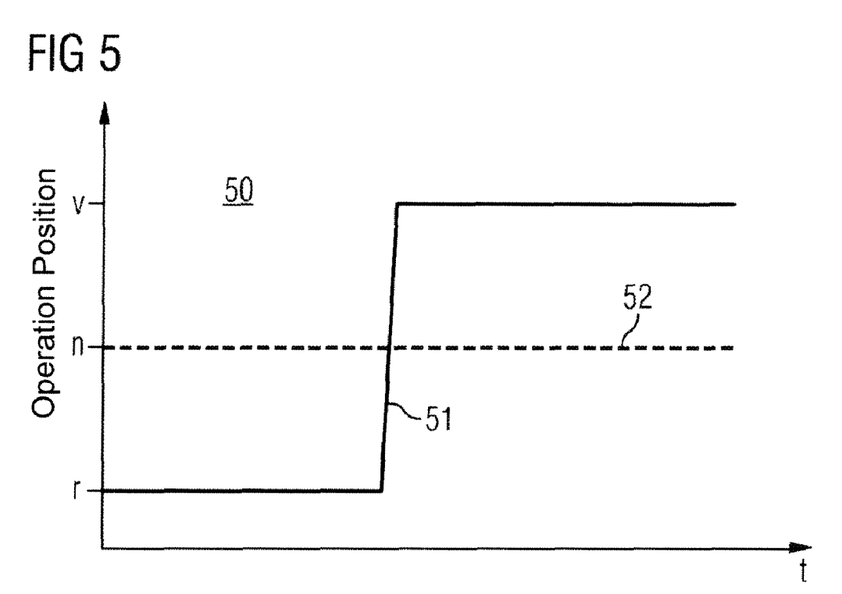
FIG. 5 shows the switch of the operating position from a position for self-boosting in the rearward direction to a position for self-boosting in the forward direction.

Diagram 40 of FIG. 4 shows the braking force pattern 42 of a wedge brake group, which is switched from an operating position for self-attenuation in the case of the given vehicle movement to an operating position for self-boosting. Diagram 50 of FIG. 5 contains the associated pattern 51 of the operating position of a wedge brake belonging to this brake group. FIG. 4 shows the braking force Bk and FIG. 5 shows the operating position of the active wedge plate over time t. The scales of the time axes of both diagrams are the same.

In the rearward position (i.e. the operating position for self-boosting during rearward travel of the vehicle), indicated by r in diagram 50, the braking force is less than in the forward position (i.e. the operating position for self-boosting during forward travel of the vehicle), indicated by v, as is adopted by the other brake group whose braking force pattern is shown by curve 41 in diagram 40. Accordingly, there is a difference 43 between the braking force contributions of both brake groups, which add up to the total braking force setpoint value Vg. The pattern of the braking force setpoint value Vg does not have to have a constant pattern 46 as shown but instead can change with time. For example, a vehicle driver can reduce the braking force just before the vehicle comes to a standstill so that the vehicle can still roll into the induction loop of an automatic traffic light system, or he can increase the braking force because he would otherwise not come to a standstill before a stop line. However, for a better understanding, a time-constant total braking force setpoint value Vg is assumed in the following. The pattern of the braking force to be applied by each of the brake groups with an equal distribution of the total braking force setpoint value is shown as a dotted line 45.

The starting point in FIGS. 4 and 5 is a vehicle braking with wedge brakes positioned in the inverse direction and a constant total braking force setpoint value 46, for example a braked rolling of the vehicle on an incline. Above a certain vehicle speed it could no longer be ensured that the total braking force required for emergency braking can be achieved. The wedge plates in the self-attenuating, or non-self-boosting, operating position are therefore, as shown in FIG. 5, switched from the rearward position r to the forward position v. During the switch the braking force of the brakes of this group reduces until the value zero is reached at the neutral position n. To ensure that the total braking force does not deviate from the predetermined braking force 46, the braking force at the brakes which are in the forward position is increased so that the braking force loss at the brakes which are switching over is compensated for. Correspondingly, the braking force pattern 41 of the brake group operating in self-boosting shows an increase which has a pattern which is a mirror image to the drop in the braking force at the brake group which is switching over. After the neutral position 52 has been exceeded, the braking force of the switching brake group increases again until it, now using the self-boosting effect, achieves the desired final value. At the same time the braking force of the brake group which is not switching over decreases so that the predetermined total braking force is neither overshot nor undershot. The difference 44 in the braking force applied by the brake groups which remains after all brake groups have switched to the operating position with self-boosting is, as already mentioned, due to considerations of driving dynamics.

With a switch of a vehicle brake system from same-direction to inverse operation of the wedge brakes, as, for example, occurs when stopping at traffic lights, the curves 41 to 42 of diagram 40 run from right to left, i.e. counter to the time axis. The straight-line pattern of the braking force variation was chosen only as an example. Any other patterns of the braking force variation are possible provided it is guaranteed that the variations at the individual brake groups take place synchronously and inversely, i.e. that the total braking forces generated by the individual brake groups always corresponds to the predetermined braking force.

In order to achieve this, the braking force setpoint value is compared with the actual deceleration of the vehicle and the braking force at the brake groups which are not switching is corrected so that the vehicle deceleration corresponds to the braking force setpoint value.

In an alternative embodiment, the braking force generated by the switching brake group(s) is detected, the deviation of this braking force from the braking force setpoint value for this/these brake group(s) is determined and the braking force of the brake group(s) which is/are not switching is corrected so that the deviation is compensated for. The detection of the braking force can be achieved by direct measurement of the friction forces generated at the individual wedge brakes or by indirect measurement using parameters linked thereto, such as the normal force with which the friction lining presses against the brake disk, the expansion of the brake caliper or similar. Advantageously, the braking force pattern during the switch is determined either by testing or by a test series or by a mathematical modeling of the process. The data obtained in this way depicts a function of the braking force pattern and is stored in a storage device of the brake control device. During the switch of a brake group the data of the function is then used to determine the respective current deviation of the braking force from the setpoint value.

Because the braking force distribution over the brake groups varies during the switchover and therefore influences the driving dynamics, switching is preferably carried out only at low vehicle speeds. Switching the brakes when stopping therefore preferably takes place when a predetermined threshold value speed is undershot, but during a slow release of the brakes on the other hand it takes place when a possible other threshold speed is overshot. Regardless of the current vehicle speed, the switch can take place in specific driving situations such as sliding on a smooth roadway so that the operating position of the brakes ensures a self-boosting in the actual direction of travel of the vehicle.

Figure 6:
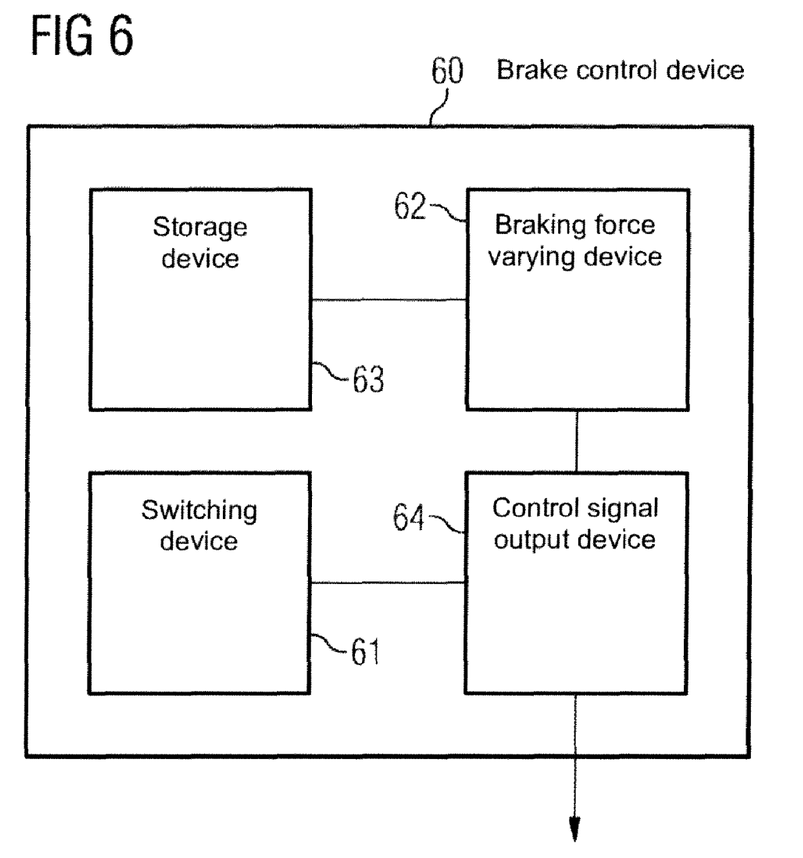
FIG. 6 shows components of the brake control device.

To implement the method described above, the brake control device 60 has, as shown in FIG. 6, a switching device 61 and a braking force varying device 62. If the current threshold value speed is undershot or overshot, the switching device 61 switches the wedge brakes of the brake group to be switched from the first operating position to the second operating position. If the vehicle is braked, a subgroup of the brakes of the vehicle is switched from the operating position with self-boosting in the current direction of travel to the operating position with self-boosting in the opposite direction of travel. Preferably, in order not to negatively influence the driving dynamics, the brakes of the wheels on the rear axle relative to the driving direction are switched. When moving off or beginning to roll with the brakes not completely released, the wedge brakes which are in the operating position without self-boosting or with self-attenuation with respect to the particular direction of travel are switched.

If the brake control device 60 is designed to control the braking force on the basis of a predetermined or previously determined braking force pattern when switching, it advantageously has a storage device 63 for storing the data of the braking force function pattern. The wedge brakes are controlled by the control signal output device 64.

FIG. 6 shows only the components of the brake control device 60 essential for an understanding of the invention. Other components necessary for operation of the brake control device 60 or for determining the scope of its functioning were omitted in the drawing to enable a clear presentation of the invention.

LIST OF REFERENCE CHARACTERS

1 Active wedge plate
2 Passive wedge plate
3 Roller bearing elements
4 Carrier
5 Friction lining
6 Brake object
7 Brake device, wedge brake
20 Wedge brakes in inverse position
21 Front wheel axle
22 Rear wheel axle
23 Right-hand front wheel
24 Left-hand front wheel
25 Right-hand rear wheel
26 Left-hand rear wheel
27 Wedge position for self-boosting in forward direction
28 Wedge position for self-boosting in rearward direction
29 Forward direction
29 Wedge brakes in same-direction position
40 Braking force diagram
41 Braking force for wedge position in direction of travel
42 Braking force for wedge position opposite to direction of travel
43 Braking force difference for wedge brakes in inverse position
44 Braking force difference for wedge brakes in same-direction position
45 Averaged braking force setpoint value per brake group
46 Total braking force setpoint value
47 No braking force
50 Wedge position diagram
51 Pattern of wedge position
52 Neutral position
60 Brake control device
61 Switching device
62 Braking force varying device
63 Storage device
64 Control signal output device

What is claimed is:

1. A method for controlling electromechanical brakes of a vehicle brake system, wherein the brakes have at least one self-boosting device and the method comprising the steps of:
   switching a first subgroup of the electromechanical brakes from a first operating position to a second operating position, and
   varying the braking force of a second subgroup of the electromechanical brakes during the switch of the first subgroup of the electromechanical brakes, such that the overall braking force applied by the vehicle brake system substantially always corresponds to a braking force setpoint value for the vehicle brake system.

2. The method according to claim 1, wherein the varying of the braking force of the second subgroup of the electromechanical brakes substantially compensates for the deviation of the braking force of the first subgroup of the electromechanical brakes from the braking force setpoint value for the first subgroup of the electromechanical brakes.

3. The method according to claim 2, wherein the varying of the braking force of the second subgroup of the electromechanical brakes takes place on the basis of a predetermined function, which specifies the deviation of the braking force of the first subgroup of the electromechanical brakes from the braking force setpoint value for the first subgroup of the electromechanical brakes during the switch from the first operating position to the second operating position.

4. The method according to claim 1, wherein the varying of the braking force of the second subgroup of the electromechanical brakes takes place on the basis of a measurement of the current braking force of at least the first subgroup of the electromechanical brakes.

5. The method according to claim 1, wherein the switching of the first subgroup of the electromechanical brakes and the varying of the braking force of the second subgroup of the electromechanical brakes takes place during the switch, so that the distribution of the braking force applied by the vehicle braking system to the first and second subgroups of the electromechanical brakes after switching corresponds to a predetermined distribution.

6. The method according to claim 1, wherein the switch of the first subgroup of the electromechanical brakes takes place at a specific vehicle speed.

7. The method according to claim 1, wherein the switch of the first subgroup of the electromechanical brakes takes place at a specific driving dynamic condition.

8. A device for controlling electromechanical brakes of a vehicle brake system, wherein the brakes have at least one self-boosting device and the device comprises:
   a switching device for switching a first subgroup of the electromechanical brakes from a first operating position to a second operating position, and
   a braking force varying device for varying the braking force of a second subgroup of the electromechanical brakes during the switch of the first subgroup of the electromechanical brakes so that the total braking force applied by the vehicle braking system always substantially corresponds to a braking force setpoint value for the vehicle braking system.

9. The device according to claim 8, wherein
the braking force varying device is operable to substantially compensate for the deviation of the braking force of the first subgroup of the electromechanical brakes from the braking force setpoint value for the first subgroup of the electromechanical brakes.

10. The device according to claim 8, wherein
the braking force varying device is operable such that varying of the braking force of the second subgroup of the electromechanical brakes takes place on the basis of a predetermined function, which specifies the deviation of the braking force of the first subgroup of the electromechanical brakes from the braking force setpoint value for the first subgroup of the electromechanical brakes during the switch from the first operating position to the second operating position.

11. The device according to claim 10, wherein the braking force varying device is operable such that varying of the braking force of the second subgroup of the electromechanical brakes takes place on the basis of a measurement of the current braking force of at least the first subgroup of the electromechanical brakes.

12. The device according to claim 8, wherein the switching device is designed to effect a switch of the first subgroup of the electromechanical brakes so that the distribution of the braking force applied by the vehicle braking system to the first and second subgroups of the electromechanical brakes after switching corresponds to a predetermined distribution.

13. The device according to claim 8, wherein the switching device is designed to effect a switch of the first subgroup of the electromechanical brakes at a specific vehicle speed.

14. The device according to claim 8, wherein the switching device is designed to effect a switch of the first subgroup of the electromechanical brakes at a specific driving dynamic condition.

* * * * *